W. C. FULLER.
PAPER BAG MACHINE.
APPLICATION FILED OCT. 9, 1906.

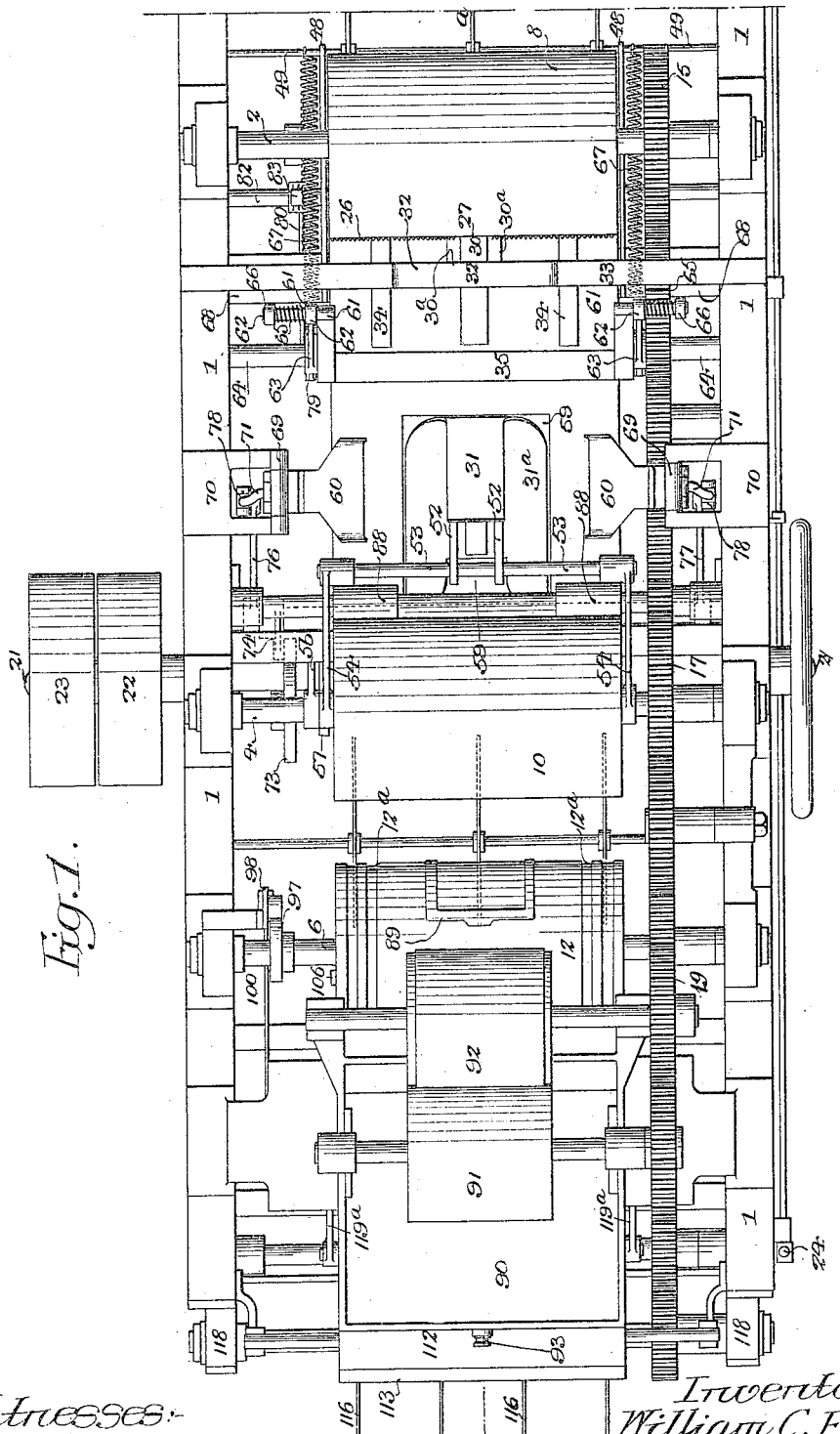

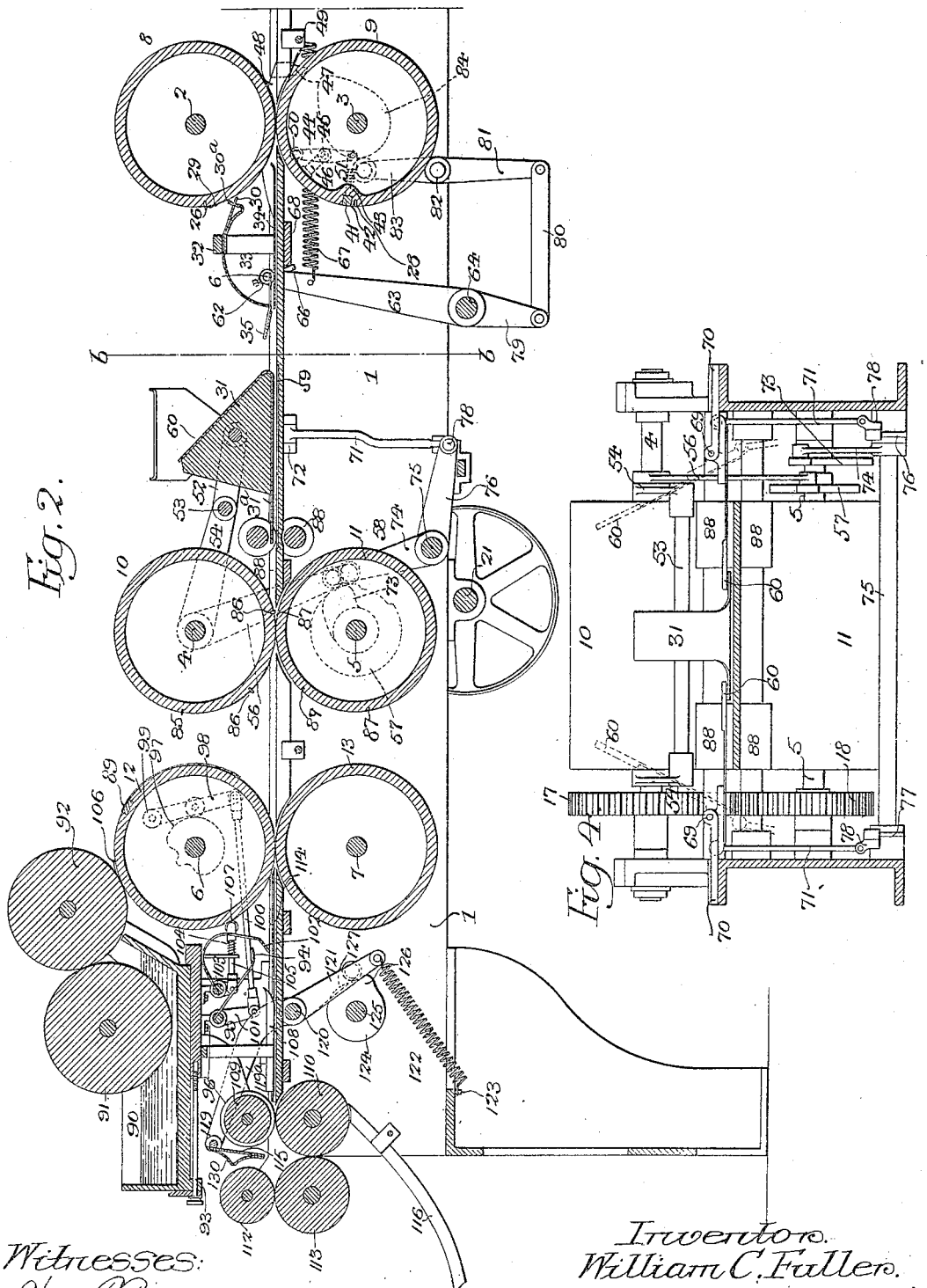

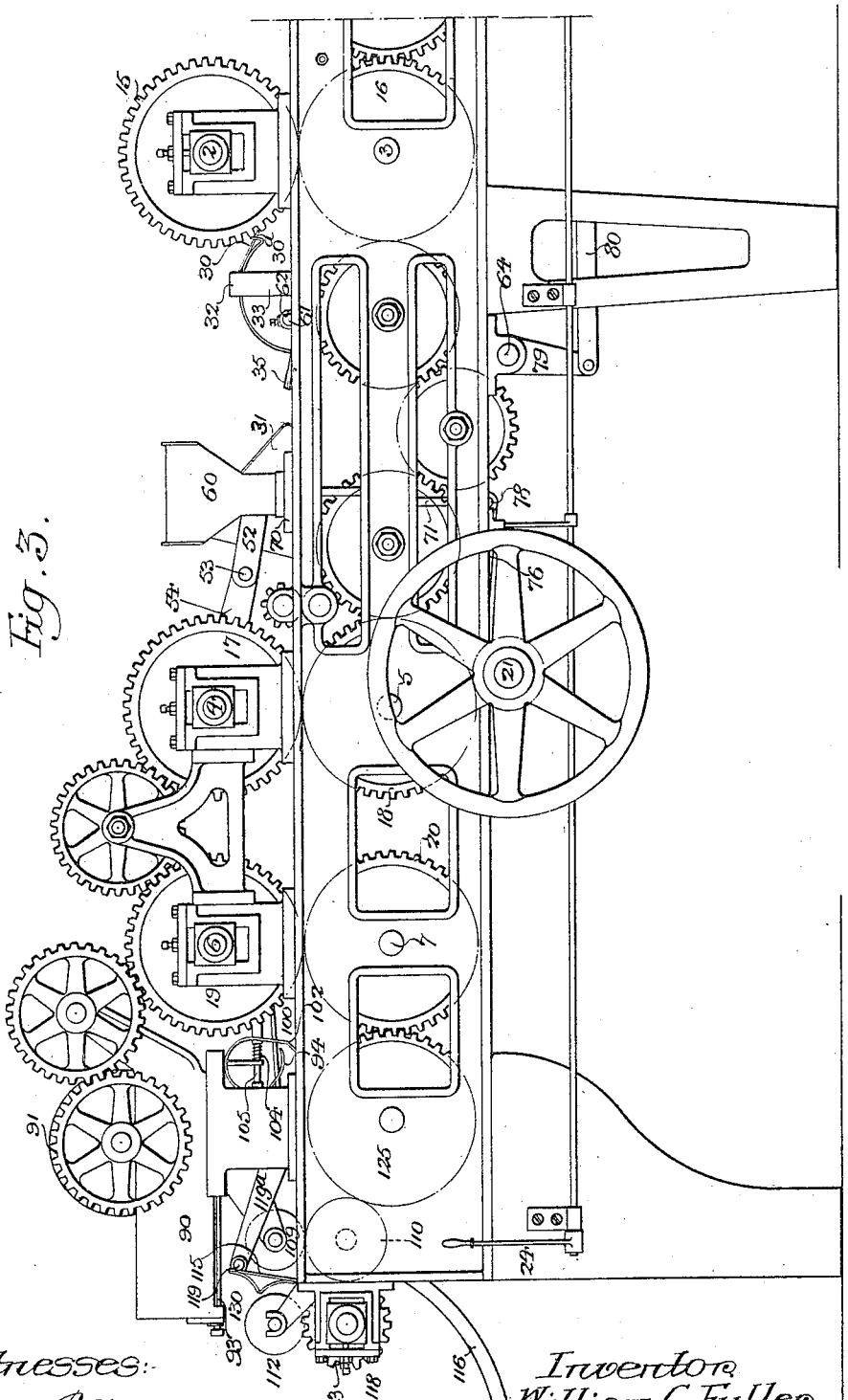

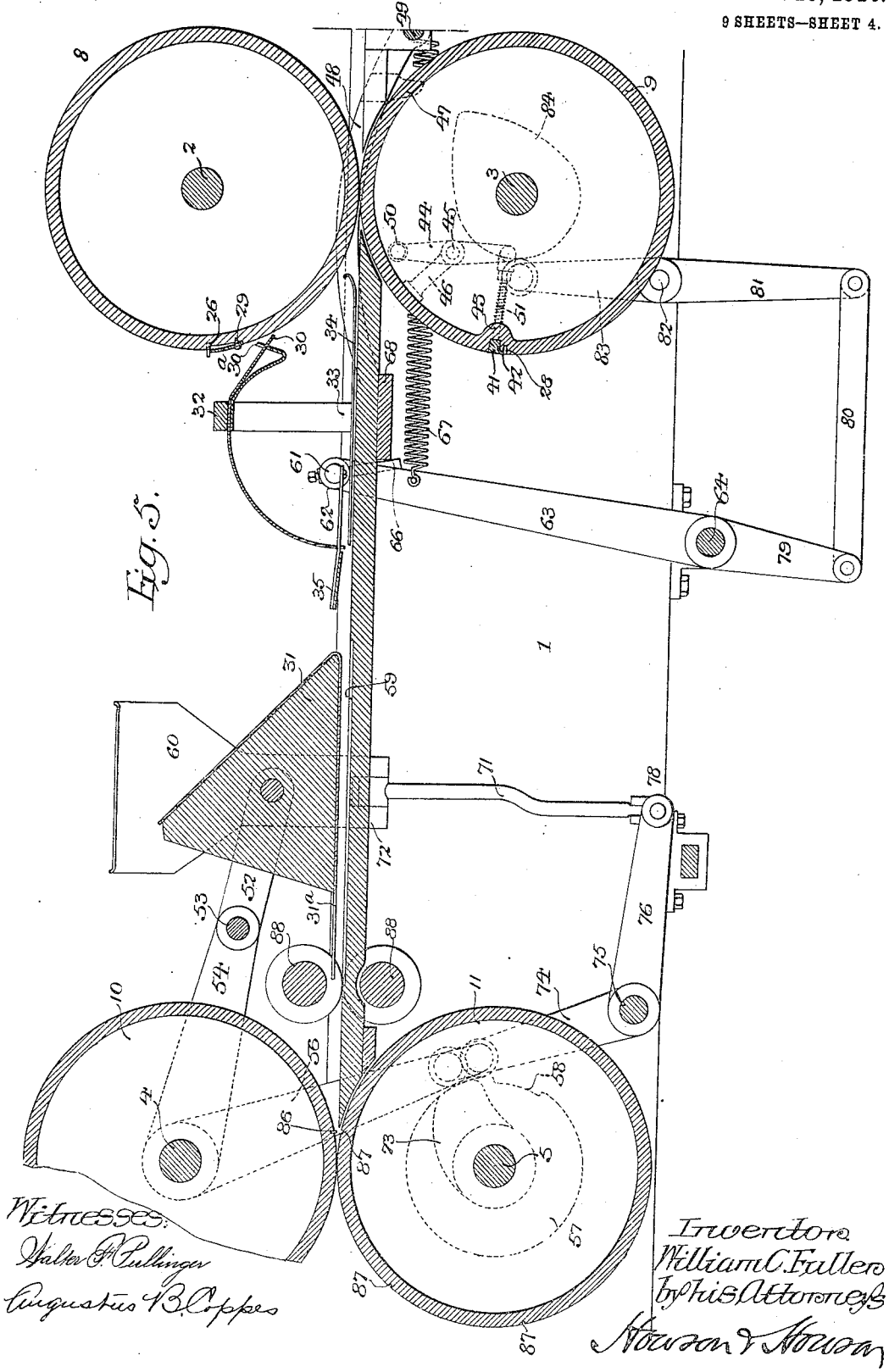

949,468.

Patented Feb. 15, 1910.
9 SHEETS—SHEET 5.

Witnesses:
Walter P. Pullinger
Augustus B. Coppes

Inventor:
William C. Fuller.
by his Attorneys.
Howson & Howson

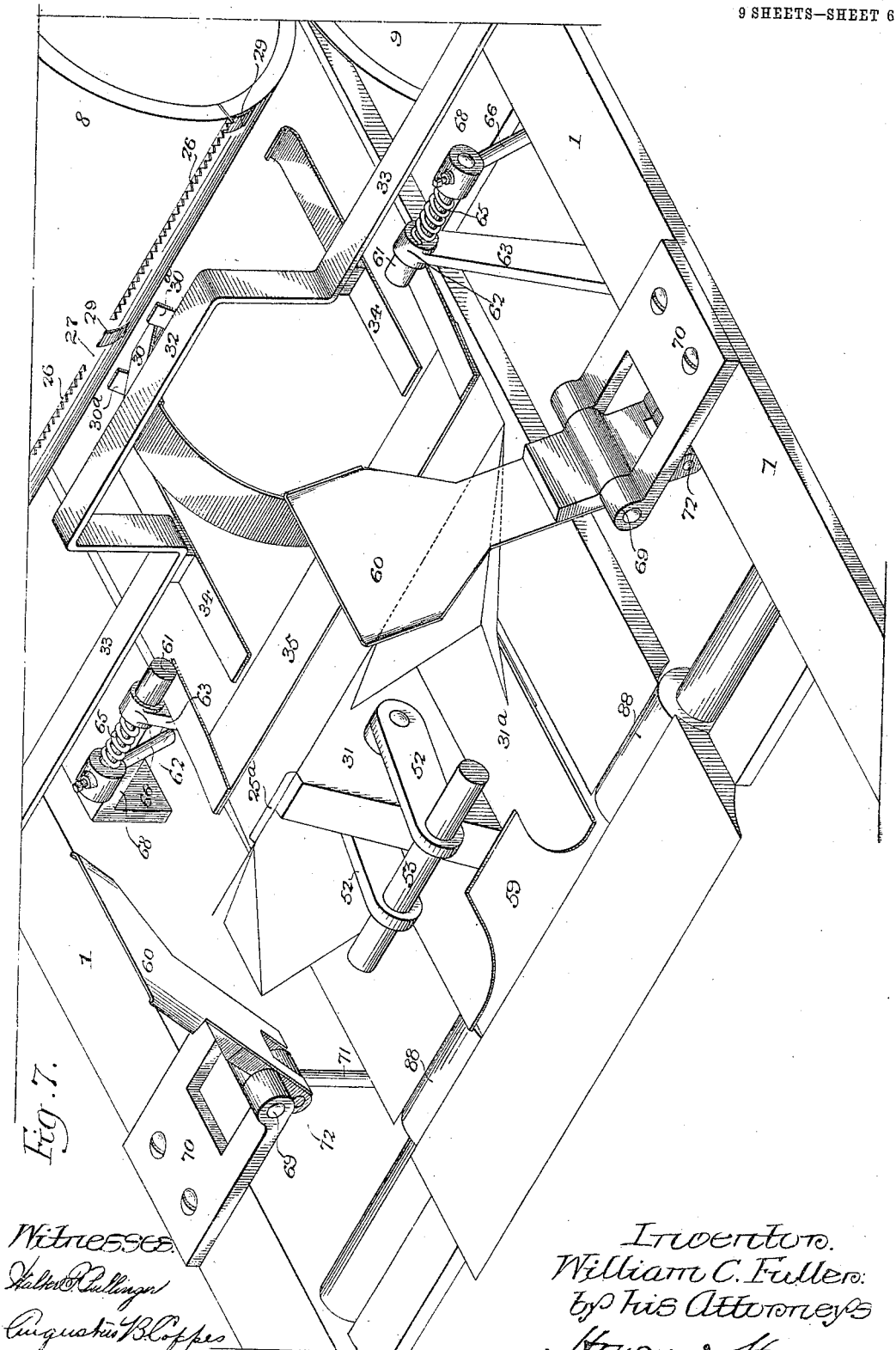

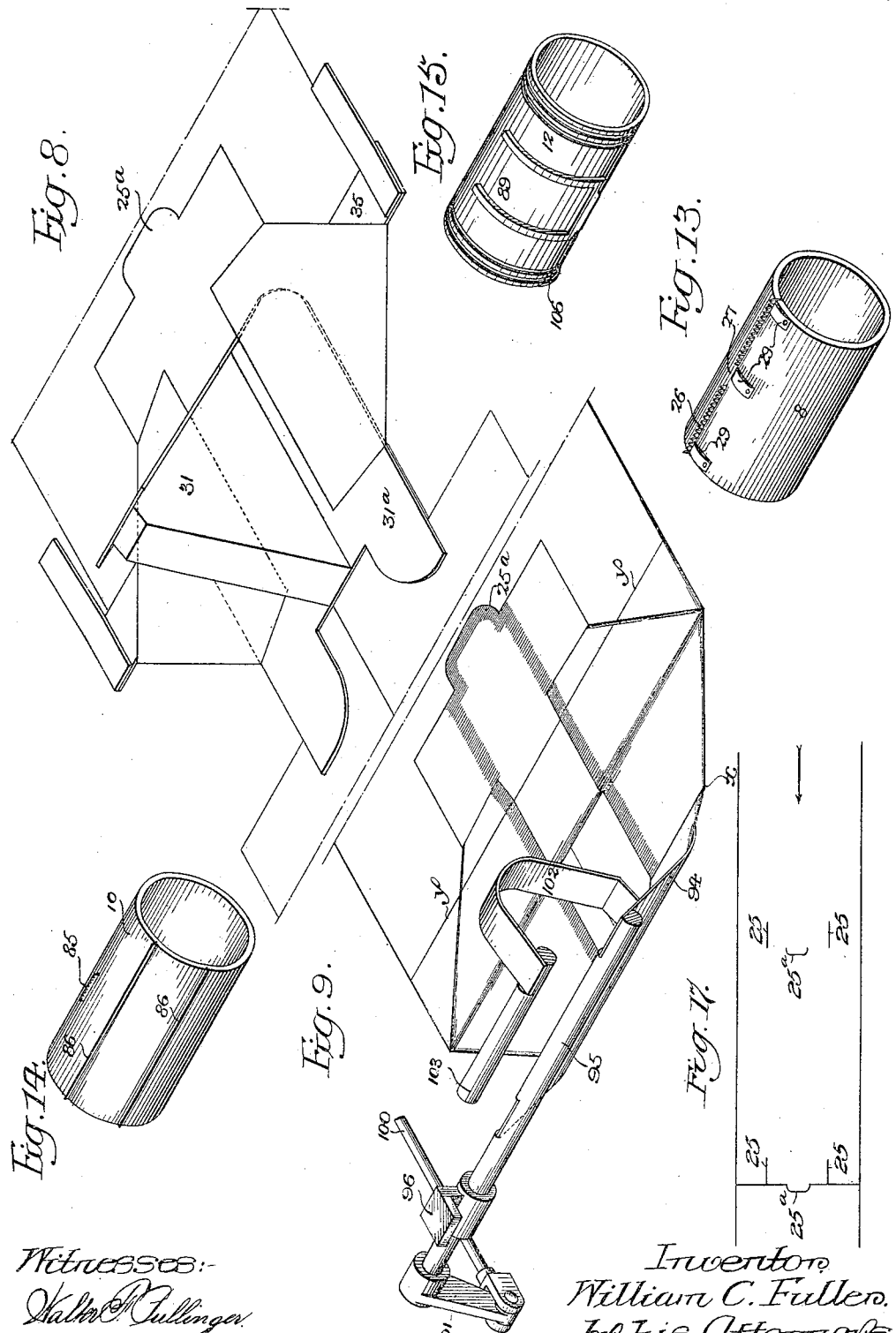

W. C. FULLER.
PAPER BAG MACHINE.
APPLICATION FILED OCT. 9, 1906.

949,468.

Patented Feb. 15, 1910.
9 SHEETS—SHEET 8.

Witnesses:—

Inventor:—
William C. Fuller.
by his Attorneys
Howson & Howson

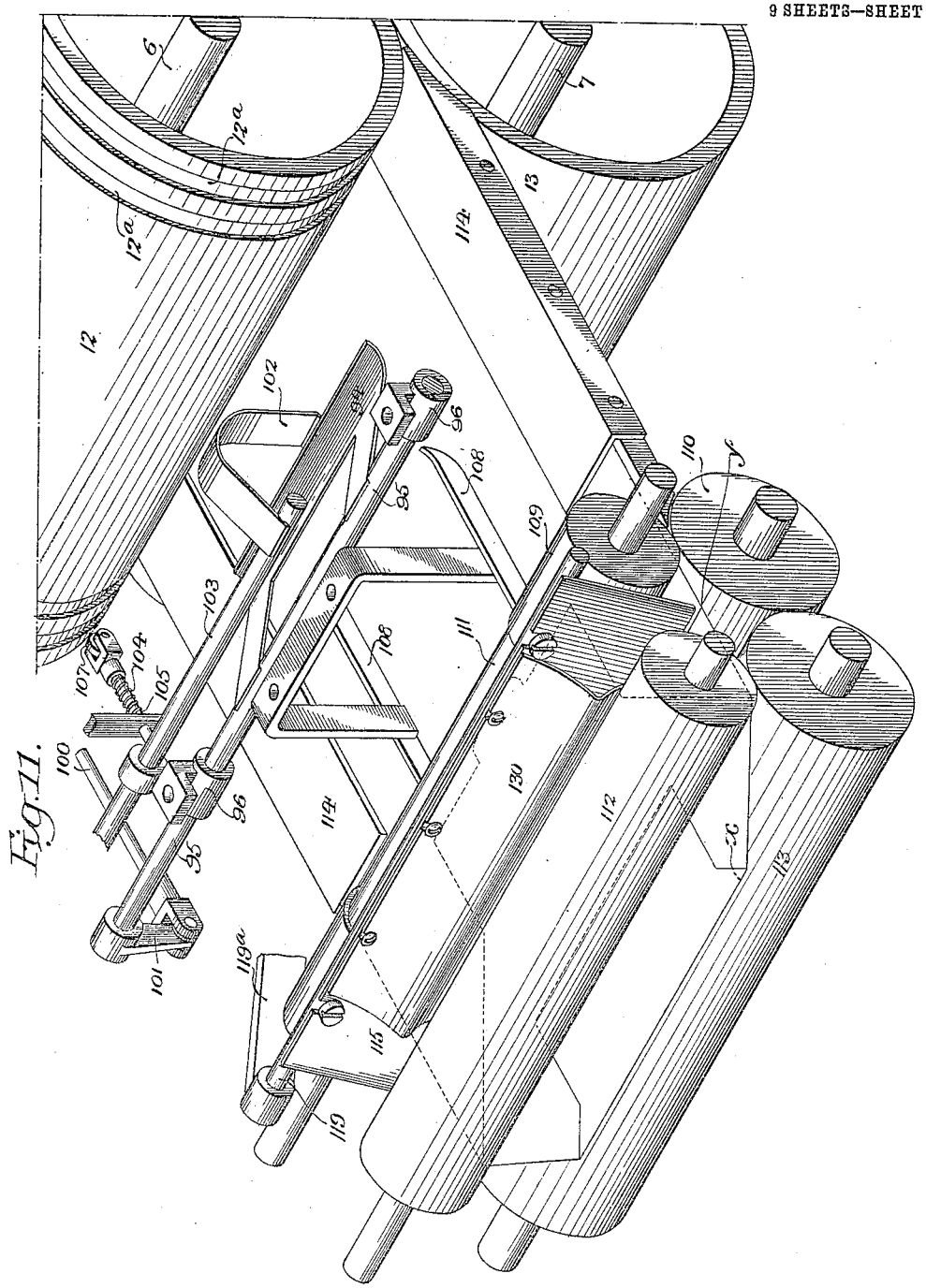

UNITED STATES PATENT OFFICE.

WILLIAM C. FULLER, OF PHILADELPHIA, PENNSYLVANIA, ASSIGNOR OF ONE-HALF TO HENRY T. SAXTON, OF PHILADELPHIA, PENNSYLVANIA.

PAPER-BAG MACHINE.

949,468.  Specification of Letters Patent.  Patented Feb. 15, 1910.

Application filed October 9, 1906. Serial No. 338,138.

*To all whom it may concern:*

Be it known that I, WILLIAM C. FULLER, a citizen of the United States, residing in Philadelphia, Pennsylvania, have invented certain Improvements in Paper-Bag Machines, of which the following is a specification.

My invention relates to paper bag machines, and it consists of certain improvements embodied in an apparatus belonging to this class of machinery which has been specially designed to make bags of heavy material and of large size, although such apparatus may be employed for the manufacture of other bags of various weights of material and of different sizes.

Figure 6:
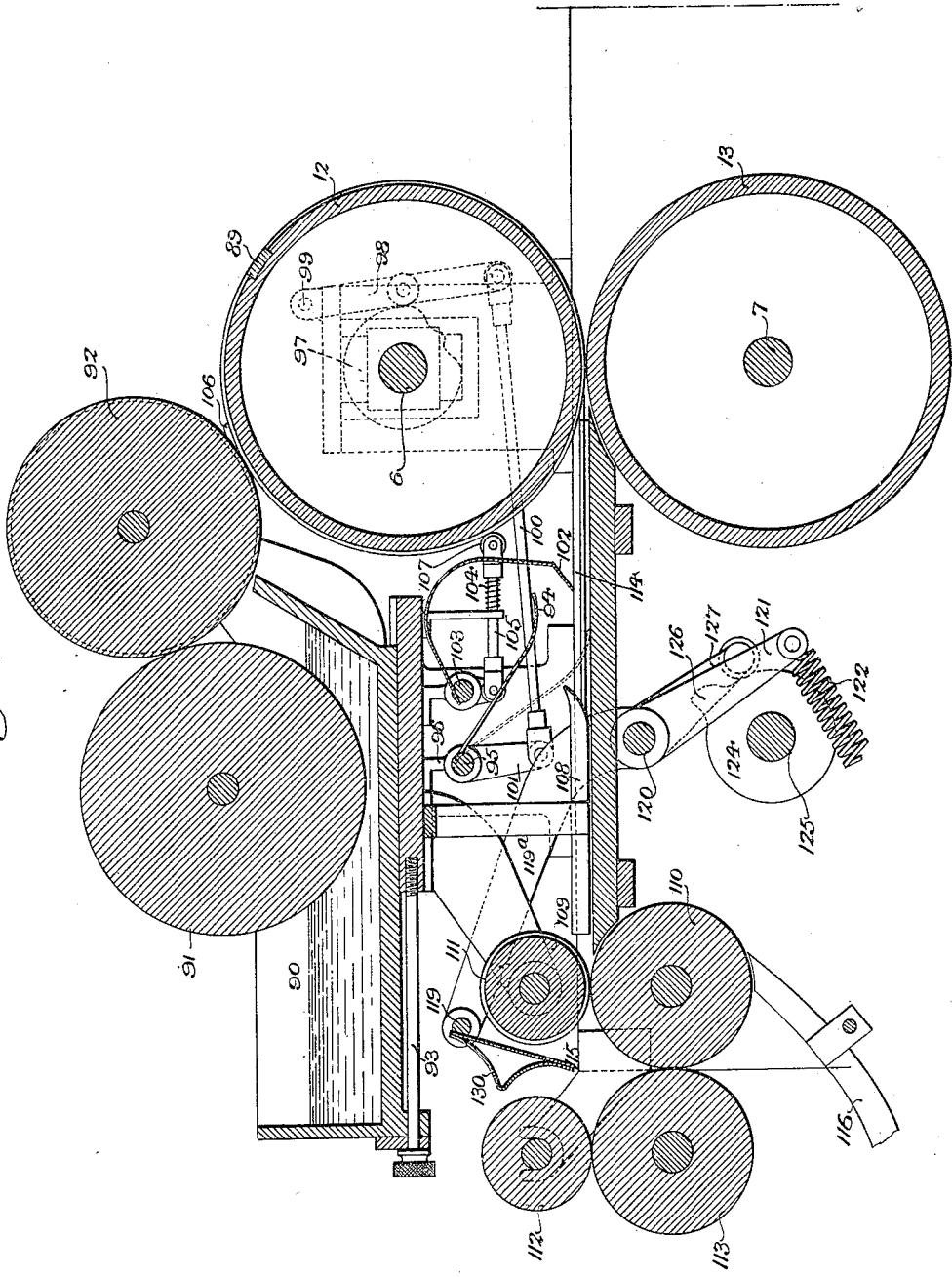
Figure 16:
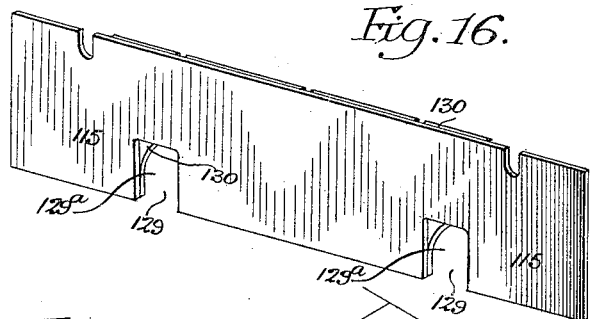
Figure 10:
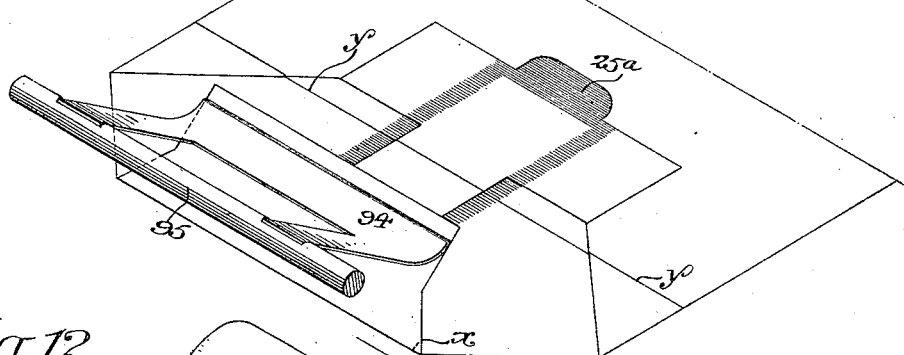
Figure 12:
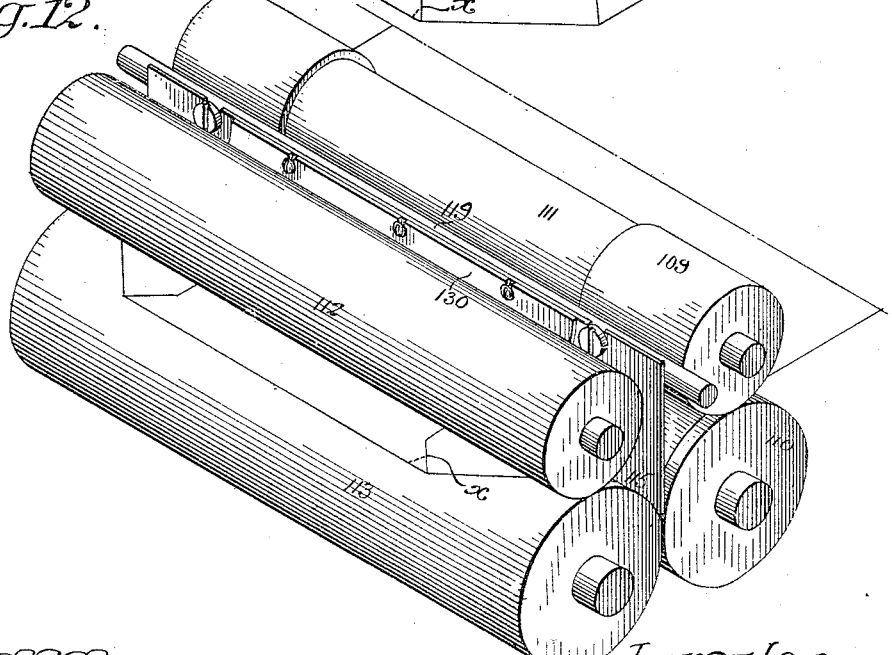

The machine forming the subject of my invention is fully shown in the accompanying drawings, in which:

Figure 1, is a plan view of the same; Fig. 2, is a sectional elevation, taken on the line $a$—$a$, Fig. 1; Fig. 3, is a side elevation showing the driving mechanism; Fig. 4, is a sectional view, taken on the line $b$—$b$, Fig. 2; Fig. 5, is an enlarged sectional view of the bottom forming mechanism, taken on the line $a$—$a$, Fig. 1; Fig. 6, is an enlarged sectional view of the pasting and final folding mechanism, taken on the line $a$—$a$, Fig. 1; Figs. 7, 8, 9, 10, 11 and 12, are perspective views illustrating the different stages of the bottom development, showing also the co-acting parts of the mechanism for effecting the formation of the same; Figs. 13, 14 and 15, are perspective views of the different knife carrying and feed rolls employed with this machine; Fig. 16, is a perspective view of a detail of the invention, and Fig. 17, is a diagrammatic view of the tube showing the preliminary cuts to form the same into blanks.

In general, the machine forming the subject of my invention, comprises a rectangular frame or body 1, suitably supported and spaced apart, and having suitable bearings in which are journaled the shafts 2 and 3, 4 and 5, and 6 and 7, of feed rolls 8 and 9; 10 and 11, and 12 and 13, respectively. These shafts have gear wheels 15, 16, 17, 18, 19 and 20, respectively, at one end of the same, forming a train, and through the medium of a series of idlers and transmitting wheels meshing therewith, they are driven from the main driving shaft 21 and serve to operate the different parts of the mechanism necessary to form the bags. The main driving shaft is provided with the usual fast and loose pulleys 22 and 23; and belt shifting mechanism of the usual type, controlled by a lever 24, is mounted at the side of the machine.

The machine forming the subject of my invention may have the usual appliances for forming a tube from a continuous sheet of paper or be connected in line with an independent apparatus for making such tube; but as such devices can be of any of the usual or well-known forms of construction they are not shown, it being deemed necessary to only show so much of the machine as will illustrate the location and operation of the mechanism for folding the bottom of the bag, and pasting the same down.

In the several perspective views the development of the bottom of the bag designed to be made is shown, such bottom being folded over by suitable defining mechanism and the parts pasted down to insure a proper closure.

Before the tube of paper is presented to the first pair of feed rolls 8 and 9, it is acted upon by cutting means (not shown) which forms short parallel slits 25 at regular intervals in both plies of the paper, and between the same substantially semi-cylindrical slits in the upper ply only of the paper, whereby tabs 25ª are produced for each blank, which tabs are afterward pasted down with the bottom of the bag. The tube in this partially prepared condition is first engaged by the feed rolls 8 and 9; the former having a pair of knives 26 arranged in line and spaced apart at 27, and these knives, coacting with a slot 28 in the roll 9, sever the blank transversely in line with one end of the slits 25; such cuts meeting the substantially semi-circular slits forming the tabs 25ª, but not separating the blank from the succeeding portion of the tube, as the under ply of paper directly beneath each of said tabs 25ª is still uncut. As the portion of the tube to form the bottom of the bag leaves the rolls 8 and 9, that portion of the upper ply between the slits 25 and carrying the tab 25ª has a tendency to ride around with the roll 8 owing to the frictional contact therewith of the knives 26 which have just made the transverse cuts through the blank, and to prevent this the surface of the roll 8 is provided with a series of flat springs 29 lying close to the knives 26 and designed to force the tab and the corners of the blank adjacent the severed edge, away from the face of the roll. In addition, a spring stripping finger 30, centrally disposed, is arranged for engagement with the tab, such finger having its operative end normally just out of contact with said roll, and on the continued movement of the latter, that portion of the upper ply of the bag blank between the slits 25 is removed from the roll by said finger. On either side of said stripping finger 30, supplemental fingers 30$^a$ are disposed which engage the tab after it has been stripped from the roll and tend to press the same over and back against the central portion of the upper ply of the blank, which action causes the tab to be set up at such a height and angle as to permit the upper ply of the blank to be readily drawn over an opening nose 31 forming part of the bottom folding devices. The stripping finger 30 and the supplemental fingers 30$^a$ are carried by the upwardly extending portion 32 of a cross-bar 33 secured to the top of the side frames 1 of the machine. This cross-bar also carries members 34 in nominal contact with the side portions of the bag blanks as they are drawn under the same, which members serve to guide said blanks under a defining plate 35, described hereinafter.

The tendency of the side portions of the lower ply of the tube is to carry around with the roll 9, and to prevent this said roll is provided with a releasing plate 41 disposed in a recess 42 in the face of said roll, which plate is arranged to be pushed out just after the knife blades leave said slot 28, engaging the unsevered portion of the tube beneath the tab 25$^a$ and thereby freeing the edge of the blank and supporting it until it passes onto the bed plate of the machine, clear of the space between the same and said roll 9. The releasing plate 41, which is disposed adjacent the slot 28, is carried by arms 43 hung from levers 44 which are pivoted at 45 to projections 46 on the inside of said roll 9. To operate said plate to release the ply of the tube blank, fixed cams 47 are provided which are secured to plates 48 hung from a rod 49 extending across the frame of the machine, and these cams overlie the path of rollers 50 carried by the opposite ends of the levers 44. The releasing plate 41 is returned to its normal position by springs 51.

After the blank leaves the rolls 8 and 9, it passes to the bottom opening and folding mechanism. This comprises the opening nose 31 centrally disposed with respect to the tube blank, and to the bottom of which a flat plate 31$^a$ is secured; said nose being carried by arms 52 rigidly attached to a bar 53 carried by arms 54 of bell-crank levers pivotally mounted on the shaft 4, the opposite arms 56 of said levers engaging disks 57 having recessed portions 58 which permit the dropping of said nose at regular intervals. The table is recessed at 59 directly beneath the plate 31$^a$ carried by the nose 31, and as the latter with said plate is depressed against the tube of which the bags are formed in advance of the tab of the approaching blank whose bottom folds are next to be made, said tube is slightly displaced which action causes the upper ply of said blank, the tab of which has been previously bent back, to rise and be carried over the opening nose and assume such shape as to have the proper folds made therein incident to forming the bottom, by the folding wings 60. To effect the movement of the opening nose, in a downward direction just before the tube blank is drawn over the same, and in an upward direction to return it to its normal position permitting the passage of the defining plate 35 thereunder, the arms 52 carrying the same are provided with extensions 56 engaged by the disks 57, the latter being recessed to permit such downward movement.

The position and shape of the nose 31 causes the upper ply of the bag blank to be thrown back as it is drawn along, and as it does so the defining plate 35 overlying said blank is brought into coaction with said nose; the latter having been lifted meanwhile to permit said plate to pass under the same so that the angular folds of the bottom can be made at the desired point with respect to the side folds of the blank. The folded portions forming the bottom then pass under the plate 31$^a$.

The defining plate 35 is carried by studs 61 journaled at 62 in the ends of levers 63 pivotally mounted on a shaft or rod 64 carried by the frame 1. Torsion springs 65 are connected to and surround said studs and tend to throw the defining plate downward into contact with the tube blank from which the bags are formed. The opposite ends of these studs carry arms 66 to which the opposite ends of the torsion springs are connected, and when the portion of the tube to form the bottom is presented to the opening nose, the defining plate is retracted and slightly elevated. The position of the defining plate is maintained by springs 67 connected to one end of said levers 63 and suitably anchored at the opposite ends to the rod 49 extending across the frame of the machine. These springs hold the levers 63 carrying the studs 61 in the retracted position and cause the arms 66 connected to said studs to engage fixed stops 68 mounted on the frame 1, such action turning said studs against the tension of the springs 65 and raising the defining plate for the passage of the tube. Simultaneously with this operation, the folding wings or blades 60 pivotally mounted on opposite sides of the machine and which are substantially the same in shape and mode of operation, are brought down on top of that portion of the paper thrown over by the opening-nose 31, which folding wings serve to flatten the same and define the angular creases of the bottom folds. The folding wings are pivotally hung at 69 from brackets 70 carried by the side frames 1 and are operated by arms 71 pivoted to said blades at 72 and controlled by a cam 73 mounted on the shaft 5 of the roll 11, which cam engages the arm 74 of a bell crank lever fixed to a shaft 75 journaled in the frame 1; the other arm 76 of said bell-crank, as well as an arm 77 at the opposite end of said shaft 75, being connected by means of a knuckle-joint 78 to the arms 71 pivotally connected to and operating said folding wings or blades.

The defining plate is employed to gage the lateral dimensions of the bottom of the bag, and this plate has movement in line with the travel of the blanks, which is effected as follows. As noted above, the plate is carried by the levers 63 which are held in the retracted position by the springs 67. The opposite arm 79 of one of these levers 63 is connected by means of a link 80 with the arm 81 of a lever pivotally mounted at 82 and having another arm 83 in engagement with a cam 84 carried by the shaft 3 of the roll 9. This mechanism, operated by said shaft, serves to move said defining plate under the opening nose, after the latter has been lifted, to properly gage and determine the dimensions of the bottom. As the tube blank is drawn against the nose, the defining plate follows and maintains its relative position until the upper ply of the bag blank in its folded over position is drawn entirely under said nose and the plate 31ª carried thereby. The plate 35 acts to define the point at which this fold is made, and as said tube is being drawn under the nose, the folding wings or blades are pressed against the side folds of the blank and form the angular creases of the same.

As soon as the folding operation is completed, the bag blank with its bottom folds in the flattened shape passes to the next pair of feed rolls 10 and 11, the upper one of which carries a knife 85 for severing the underply of the bag blank originally left directly beneath the tab 25ª; thereby permitting the forward bag blank to have its bottom pasted down and be discharged from the machine. The roll 10 is also provided with blades 86 which coact with grooves 87 in the roll 11 and serve to place the creases, indicated at $x$ and $y$, across the folded portions of the end of the bag; defining the points at which such folded portions are to be finally turned over and pasted down to form the bottom of the finished bag. To insure the flattening of the bottom of the blank, a pair of small rolls 88 are mounted behind the rolls 10 and 11, and these rolls, acting in advance of the rolls 10 and 11, serve also as feed rolls, a matter particularly desirable when light material is being used for the bags in process of manufacture as it relieves the strain on the small unsevered portion of the tube connected to the blank in advance.

From the rolls 10 and 11, the severed bags, ready to have their bottoms pasted together, are fed to the rolls 12 and 13, from the former of which they receive the necessary paste and by which they are fed to the mechanism for turning over said bottom and securing its folds together. The roll 12 is provided with the usual horseshoe-shaped engaging surface 89 to apply paste to the folded portions of the bottom of the bag at the points desired in the manner illustrated in Figs. 12 and 13. The paste is carried in a pan 90 at the forward end of the machine, which pan is suitably mounted and has the dipping roll 91 and the intermediate roll 92 to transfer a proper amount of said paste to the engaging surface 89 of the roll 12. The paste carrying structure is removable, and the pan may be adjusted by a screw 93 to regulate the contact of the roll 92.

As the bags pass on after the paste applying operation, the forward portion in front of the crease $x$, which is to be first turned over and pasted down to form a portion of the bottom of the bag, is caught by a plate 94 hung from a rod 95 mounted in bearings 96 supported by the frame of the machine. This plate is lowered to engage such portion and raised to effect the required action by means of a cam 97 mounted on the shaft 6, which cam acts against a lever 98, pivoted at 99 and connected by means of a link 100 with an arm 101 connected to the rod 95 which supports said plate 94. To hold the seam during the turning of the bottom, a plate 102 is provided, hung from a rod 103 pivotally mounted in suitable bearings, and normally held out of action by a spring 104 mounted on a rod 105 connected to said rod 103. This plate is lowered at the proper time by a cam or projection 106 mounted on the end of the roll 12, which cam or projection engages a roller 107 on the end of the rod 105 and moves the latter against the action of the spring 104. As the bag blank continues its movement, the forward end is engaged by the plate 94 which is afterward raised and turns over this forward portion of the bottom on the fold $x$ and presses the same against the plate 102 holding the seam. As the bag blank proceeds it passes under the guides 108, which serve to hold down this forward pasted portion and pass this end of the bag to the rolls 109 and 110, the former being a weighted idler, having a cut out portion 111 to avoid the pasted area of the bottom, which weighted idler serves also to feed the bag blanks.

As the bag blank with its folded and pasted forward end leaves the rolls 109 and 110, it passes to the rolls 112 and 113, the former also a weighted idler. Said roll 112 serves to hold down and flatten the forward portion of the bottom folded on the line $x$. To insure the turning of said forward end of the bottom on the line $x$, side guides are provided indicated at 114 under which the sides of the bags pass, and the inner edges of said guides come opposite the point where said crease $x$ meets the angular folds at the end of the bag. As the end is turned over by said plate 94, the guides hold down the rest of the bag. The inner ends of the guides 114 are provided with fingers which fit into annular grooves $12^a$ in the roll 12, thereby lying above the face of said roll and insuring the passage of the bag blanks under said guides. As soon as the crease $y$ of said bottom reaches a point midway of the rolls 110 and 113, a tucking blade 115 is brought down against the bag bottom, which blade bends the latter and presses the same into the bite of said rolls; withdrawing the forward portion from between the rolls 112 and 113. The whole bottom, folded back against itself, is then passed between said rolls 110 and 113, which action brings the rear portion of said bottom with its pasted area against the forward part and insures the proper fastening of said bottom. The rolls 110 and 113 are driven at a greater speed than the rolls 12 and 13, so as to drag the blanks quickly away from the latter and insure the spacing of the same for the proper action of the plate 94, and from said rolls 110 and 113, the finished bags drop onto a delivery chute 116. The journals of the roll 113 are mounted in spring boxes 118 so that said roll may automatically compensate for the several thicknesses of paper as well as the bulge produced by the tucking blade 115 which passes the folded portion of the bag into the bite of the rolls 110 and 113.

The tucking blade is secured to a rod 119 carried by arms $119^a$ fixed to a rod or shaft 120, journaled in the side frames of the machine. This rod or shaft carries an arm 121 to which a spring 122, anchored at 123, is connected, such device serving to hold said blade normally out of engagement with the bag. To throw the blade into engagement with the bag, a disk 124, mounted on a shaft 125, is provided; said disk having a cam or projection 126 which is arranged to engage an arm 127, also carried by the shaft 120, at proper intervals and move the blade 115 into engagement with the bag bottom. The tucking blade is cut away at 129 opposite the pasted area of the bottom of the bag to prevent the blade wiping said paste away. This blade also carries a guard 130 to prevent the bottom fold first made coming in contact with the tucking blade until said bottom is passed between the rolls 110 and 113, and this guard is cut away at $129^a$ to avoid the paste. After the bags leave the chute 116, they may be carried away by any suitable means.

It will be noted that the bottoms as made by the machine described herein require very much less paper than bag bottoms made by machines of the prior art, while at the same time, the bottoms produced by the present machine are substantial and strong and serve every practical purpose. The saving of paper is a considerable item when the output of bags of which the machine is capable is taken into account.

I claim:

1. In a machine for making paper bags from tubular blanks, the combination of means for feeding said blanks, a table over which said tube of paper is passed, bottom forming mechanism including an opening nose to which the successive blanks are presented, and means for imparting vertical movement to said nose whereby it is depressed against the tube to buckle the same and raise the upper ply of the advancing blank and cause it to ride on to said nose, said table having a recess permitting the depression of the opening nose.

2. In a machine for making paper bags from tubular blanks, the combination of means for feeding said blanks, a table over which said tube of paper is passed, bottom forming mechanism including an opening nose to which the successive blanks are presented, means for imparting vertical movement to said nose whereby it is depressed against the tube to buckle the same and raise the upper ply of the advancing blank and cause it to ride on to said nose, said table having a recess permitting the depression of the opening nose, a plate carried by said nose, and means for advancing the blank and carrying the folded portion under said plate.

3. In a machine for making bags from continuous tube blanks, each having a tab formed in one ply and parallel cuts in both plies of said tube, means for severing the tube transversely excepting the portion underlying said tab, means for disengaging the edges of the severed portion from the severing means, means for insuring the forward feed of the tube past such severing means, means for forming the bottom folds including a depressible nose for buckling the blank to cause a separation of that portion of the tube adjacent the unsevered portion whereby the upper ply of said blank may ride onto said nose, said table having a recess into which said nose may be depressed, and means for securing together said folded portions to form the bottom of the bag.

4. In a machine designed to form bags from continuous tube blanks, each having a tab formed in one ply and parallel cuts in both plies of the tube, the combination of a table means for severing the entire width of the tube excepting the portion underlying said tab, a vertically movable opening nose for separating the plies of the severed portion and over which said open end is adapted to be drawn to spread the same and form the bottom folds, folding wings for flattening the portion raised by said nose, means for applying paste to the folded portion, and means for securing the parts thereof to form the bottom, the bed of the table being recessed to permit depression of the tube and provide for separation of said plies to permit the upper one to ride over the nose.

5. In a machine designed to form bags from continuous tube blanks, each having a tab formed in one ply and parallel cuts in both plies of said tube, the combination of a table, means for severing the entire width of the tube excepting the portion underlying said tab, means for raising said tab, an opening nose over which the severed ply of said tube is drawn, said ply being guided by the raised tab, means for lowering said nose against the tube to effect separation of said plies and permit the upper one to ride over said nose, the table being recessed for the purpose, folding wings for flattening the portion raised by said nose, a plate for defining the dimensions of the bottom, and means for raising said nose for the passage of said defining plate.

6. In a machine designed to form bags from continuous tube blanks, each having a tab formed in one ply and parallel cuts in both plies of the tube, the combination of a table, means for severing the entire width of the tube excepting the portion underlying said tab, means for raising said tab, an opening nose over which the severed ply of said tube is drawn, said ply being guided by the raised tab, means for lowering said nose against the tube to effect separation of said plies and permit the upper one to ride over said nose, the table being recessed for the purpose, folding wings for flattening the portion raised by said nose, and supplemental feed rolls arranged at the rear of said nose to feed the tube blank to the bite of the main feed rolls and prevent the breaking of the unsevered ply at the seam.

7. In a machine designed to form bags from continuous tube blanks, each having a tab formed in one ply and parallel cuts in both plies of said tube, the combination of a table, means for severing the entire width of the tube excepting the portion underlying said tab, means for raising said tab, an opening nose over which the plies of said tube are drawn, said tube being guided by the raised tab, means for lowering said nose against the tube to effect separation of said plies and permit the upper one to ride over said nose, the table being recessed for the purpose, folding wings for flattening the portion raised by said nose, means for holding the tube and defining the dimensions of the bottom during the action of said folding wings, means for applying paste to a portion of said folds, means for creasing said folded portions, and means for turning over the portions on the lines of said creases whereby the bottom may be confined in place by said paste.

8. In a machine designed to form bags from continuous tube blanks, each having a tab formed in one ply and parallel cuts in both plies of said tube, the combination of a table, means for severing the entire width of the tube excepting the portion underlying said tab, means for raising said tab, an opening nose over which the plies of said tube are drawn, said plies being guided by the raised tab, means for lowering said nose against the tube to effect separation of said plies and permit insertion of the nose, the table being recessed for the purpose, folding wings for flattening the portion raised by said nose, means for applying paste to a portion of the folds, a roll having blades for creasing said folded portion, means for turning one portion of the bottom on the lines of one crease, and means for passing the portion of the bottom at the other crease through a pair of rolls whereby the bottom will be confined in place by said paste.

9. In a machine designed to form bags from continuous tube blanks, each having a tab formed in one ply and parallel cuts in both plies of the same, means for severing said tubes, a vertically movable opening nose for separating the plies at the forward end of the tube, means coacting with said nose for forming bottom folds at one end of the same, means for applying paste to said bottom folds, means for creasing the bottom folds preparatory to applying the paste, means for turning the bottom flaps in finishing the bottom, means for holding the seam while the first flap is being turned in forming said bottom, said means holding said seam and preventing it spreading while the flap is being turned, and means for operating said seam holding means.

10. In a machine for making paper bags, the combination with mechanism for putting folds in the end of a blank to form the botton of a bag including means for creasing the folded portions, of means for applying paste to said folded portions, means for holding the seamed portion of the bag, means for turning over that portion of the bottom lying in advance of the first crease whereby one part of the bottom is formed, the seam holding means being in operative engagement with the bag while a portion of the bottom is being turned, and means for finishing said bottom.

11. In a machine for making paper bags, the combination with mechanism for putting folds in the end of a blank to form the bottom of a bag including means for creasing the folded portions, of means for applying paste to the folded portions of said bag, a plate for holding the seamed portion of the bag, means for operating said plate, means for turning over that portion of the bottom lying in advance of the first crease whereby one part of the bottom is formed, such turning taking place while the holding plate is in operative engagement with the seamed portion of the bag bottom, and means for finishing said bottom.

12. In a machine for making paper bags, the combination with mechanism for putting folds in the end of a blank to form the bottom of a bag including means for creasing the folded portions, of means for applying paste to the folded portions of said bag, means for holding the seamed portion of the bag, means for operating said holding means, means for turning over that portion of the bottom lying in advance of the first crease whereby one part of the bottom is formed, means for operating said turning means, and means for finishing said bottom.

13. In a machine for making paper bags, the combination with mechanism for putting folds in the end of a blank to form the bottom of a bag including means for creasing the folded portions, of means for applying paste to the folded portions of said bag, a plate for holding the seamed portion of the bag, means for operating said plate, a second plate for turning over that portion of the blank bottom lying in advance of the first crease whereby one part of the bottom is formed, a series of levers for operating said second plate, a cam for operating said levers, and means for finishing said bottom.

14. In a machine for making paper bags, the combination of mechanism for putting folds in the end of a blank to form the bottom of a bag, feeding mechanism for said partially finished blanks, pasting mechanism therefor, means for creasing said folded bottom portion of the blanks transversely to define the area of said bottom, means for turning the portion adjacent one of said creases whereby one portion of the pasted parts may be secured together, means for holding the edges of said blanks during the turning operation, and rolls between which said bottom is firmly passed to press the rest of the pasted parts together.

15. In a machine for making paper bags, the combination of mechanism for putting folds in the end of a blank to form the bottom of a bag, feeding mechanism for said partially finished blanks, means for creasing said folded bottom portion of the blanks transversely to the length of the bag to define the area of said bottom, mechanism for applying paste to the necessary portions of said bottom whereby the parts of the same may be secured together, means for turning the portion of said bottom adjacent one of the creases, means for holding the edges of said blanks during the turning operation, and a series of weighted and tension rolls between which said bottom in its folded and pasted condition is passed to press a portion of the pasted parts together and effect the finishing of the bag.

16. In a machine for making paper bags, the combination of mechanism for putting folds in the end of a blank to form the bottom of a bag, feeding mechanism for said partially finished blanks, pasting mechanism therefor, means for creasing the folded bottom portion of the blanks transversely to define the area of said bottom, means for turning one of said bottom portions whereby the pasted parts of the same may be secured together, means for holding the edges of said blanks during the turning operation, two pairs of weighted and tension rolls between which said bottom is passed in one direction, and a pivotally mounted tucking blade arranged to be moved into engagement with the blank to press the bottom in folded form into the bite of the lower roll of each pair in another direction to press the other pasted parts of the bottom together and effect the finishing of the bag.

17. In a machine for forming paper bags, the combination of mechanism for putting folds in the end of a blank to form the bottom of a bag, feeding mechanism for said partially finished blanks, pasting mechanism therefor, means for creasing the folded portions of the blanks transversely to define the area of said bottom, means for turning a portion of the bottom whereby some of the pasted parts may be secured together, means for holding the edge of the blank during such turning operation, two pairs of rolls between which said bottom is passed in one direction, a pivotally mounted tucking blade serving to press the bottom in folded form between the lower roll of each pair in another direction, and means for operating said tucking blade at proper intervals, said latter rolls serving to press the other pasted parts of the bottom together and effect the finishing of the bag.

18. In a machine for making bags from continuous tube blanks, the combination of a table, means for severing the entire width of the tube excepting a narrow central portion of the under-ply, a vertically movable opening nose for separating the plies of the severed portion and over which said open end is adapted to be drawn to spread the same and form the bottom folds, folding wings for flattening the portion raised by said nose, means for applying paste to the folded portion, and means for securing the parts thereof to form the bottom, the bed of the table being recessed to permit depression of the tube and provide for separation of said plies to permit the upper one to ride over the nose.

19. In a machine for making bags from continuous tube blanks, the combination of a table, means for severing the entire width of the tube excepting a narrow central portion of the under-ply, means for raising the tab of said severed ply, an opening nose over which said tube is drawn, means for lowering said nose against the tube to effect separation of said plies and permit the upper one to ride over said nose, the table being recessed for the purpose, folding wings for flattening the portion raised by said nose, a plate for defining the dimensions of the bottom, and means for raising said nose for the passage of said defining plate.

20. In a machine for making bags from continuous tube blanks, the combination of a table, means for severing the entire width of the tube excepting a narrow central portion of the under-ply, means for raising the tab of said severed ply, an opening nose over which said tube is drawn, means for lowering said nose against the tube to effect separation of said plies and permit the upper one to ride over said nose, the table being recessed for the purpose, folding wings for flattening the portion raised by said nose, and supplemental feed rolls arranged at the rear of said nose to feed the tube blank to the bite of the main feed rolls and prevent the breaking of the unsevered ply at the seam.

21. In a machine for making bags from continuous tube blanks, each having a tab formed in one ply and parallel cuts in both plies of said tube, means for severing the entire width of the tube excepting the portion underlying said tab, means for raising said tab, and an opening nose over which the severed ply of said tube is drawn preparatory to forming the bottom, said tube being guided by the raised tab.

22. In a machine for making bags from continuous tube blanks, each having a tab formed in one ply and parallel cuts in both plies of said tube, means for severing the entire width of the tube excepting the portion underlying said tab, a finger for raising said tab, means for holding the rest of ply during such action, and an opening nose over which the severed ply of said tube is drawn preparatory to forming the bottom, said ply being guided by the raised tab.

23. In a machine for making paper bags from tubular blanks, the combination of means for feeding a tube of paper from which such blanks are cut, a table over which said tube of paper is passed, bottom folding mechanism including an opening nose to which the successive blanks are presented, means for imparting vertical movement to said nose whereby it is depressed against the tube to buckle the same and raise the upper ply of the advancing blank and cause it to pass over said nose, said table having a recess permitting the depression of the opening nose, a plate carried by said nose, means for advancing the blank and carrying the folded portion under said plate, and means for defining the lateral dimensions of the bottom.

24. In a machine for making paper bags from tubular blanks, the combination of a table over which said tube of paper is passed, an opening nose to which the successive blanks are presented, means for imparting vertical movement to said nose whereby it is depressed against the tube to buckle the same and raise the upper ply of the advancing blank and cause it to pass over said nose, said table having a recess permitting the depression of the opening nose, means for feeding the tube, and a plate co-acting with said feeding mechanism to define the lateral dimensions of the bag.

25. In a machine for making bags from continuous tube blanks wholly disconnected transversely except for a narrow portion of the under ply, the combination of means for feeding said blanks, a depressible nose for opening the end of the same, folding wings operated at right angles to said nose for engaging the opened portions to place the bottom folds therein, rolls for applying paste to a portion of said folds, means for creasing parts of the bottom folded portions transversely to define the area of said bottom preparatory to applying the paste, guiding means disposed beyond the paste roll for holding the edges of the blank while the first portion of the bottom is being turned, means for turning said first bottom flap, said means also serving to press or iron the same, and means for securing the rest of the pasted parts of the bottom to finish the bag.

26. In a machine for making paper bags from tubular blanks, the combination of a table over which the blanks are passed, means for feeding said blanks, bottom forming mechanism including an opening nose to which said blanks are presented, levers carrying said nose, and means for actuating said levers to depress said nose against the tube to buckle the same and raise the upper ply of the advancing blank and cause it to ride onto said nose, said table having a recess into which the nose may be depressed to effect such buckling action.

27. In a machine for making paper bags from tubular blanks, the combination of a table over which the blanks are passed, means for feeding said blanks, bottom forming mechanism including a depressible opening nose to which said blanks are successively presented, a plate carried by the base of said nose, and means for lowering said nose and its plate against the tube to buckle the same whereby the upper ply of the advancing blank will be raised and caused to ride onto said nose, the table having a recess into which said nose may be depressed to effect such buckling action.

28. In a machine for making paper bags from tubular blanks, the combination of a table over which the blanks are passed, means for feeding said blanks, bottom forming mechanism including a depressible opening nose to which said blanks are presented, means for lowering said nose against the tube to buckle the same whereby the upper ply of the advancing blank will be raised and caused to ride onto said nose, the table having a recess into which said nose may be depressed to effect such buckling action, a bottom plate carried by said nose, and means for advancing the blank and carrying the bottom folded portion of the same under said bottom plate.

29. In a machine for making bags from continuous tube blanks, each of which is provided with a tab carried by one ply and parallel cuts in both plies of the same, the combination of a table over which the blanks are passed, means for severing the blank transversely on opposite sides of said tab excepting that portion of the under-ply directly beneath the tab, means for preventing said cutting means carrying that portion of the blank adjacent the severed portions of the plies away from the line of movement of said blank, means, including a depressible nose, for separating the severed end of the blank and folding the plies of the same, means for lowering said nose to bring it into the operative position, and means for securing together the folded portions of the blank to form the bottom, the table having a recess into which said nose may be depressed.

30. In a machine for making bags from continuous tube blanks, each of which is provided with a tab carried by one ply and parallel cuts in both plies of the same, the combination of a table over which the blanks are passed, means for severing the blank transversely on opposite sides of said tab excepting that portion directly underlying said tab, a depressible nose for buckling the blank and separating the plies at the forward end of each succeeding blank onto which the upper ply of said tube blank rides until said folds are made, means for lowering said nose to bring it into the operative position, the table having a recess into which said nose may be depressed to effect such buckling action, folding wings to engage the opened portions of the tube blank, a roll for applying paste to a portion of said folds, means for creasing said folds transversely to define the area of the bottom preparatory to applying the paste, guiding means disposed behind the paste roll for holding and preventing the lifting of the tube while making the first transverse fold of the bottom, means for turning said first bottom flap, said means also serving to press or iron the same, and means for finishing said bottom.

31. In a machine for making bags from continuous tube blanks, each having a tab formed in one ply and parallel cuts in both plies of the same, the combination of a table over which the blanks are passed, means for severing said tube transversely excepting that portion directly underlying said tab, whereby said blank may be carried with the main body of the tube, means for forming the bottom, including a depressible opening nose, means for lowering said nose against the tube to buckle the same whereby the upper ply of the advancing blank will be raised and caused to ride onto said nose, the table having a recess into which said nose may be depressed, folding wings to fold down the portion opened, a defining plate co-acting with said folding mechanism to define the dimensions of said bottom, mechanism for creasing said bottom portion whereby the size and shape of the latter may be defined, means for applying paste thereto, means for folding the bottom portions or flaps upon themselves after the paste has been applied, and pressing rollers for holding said turned flaps to insure retention of the same.

32. In a paper bag machine, the combination of means for forming in a blank the necessary folds to be subsequently secured together to form the bottom of a bag, a pair of rolls for feeding said blanks, guide plates disposed beyond said rolls under which the side edges of the blanks are passed, means for creasing a portion of the folded part of said blank bottom transversely, and means for turning over such portion of the bottom on said crease while the edges of the blank are confined by said guide plates.

33. In a paper bag machine, the combination of means for forming in a blank the necessary folds to be subsequently secured together to form the bottom of a bag, a pair of feed rolls, means for driving the same whereby the bag blank may be traversed through the machine, guide plates disposed beyond said rolls under which the side edges of said blank are passed, means for creasing a portion of the folded part of said blank bottom transversely, and means for turning over such portion of the bottom on said crease while the edges of the blank adjacent such folded portion are confined by the guide plates, said guide plates having slotted extensions projected toward the bite of the rolls so as to insure the passage of said bag under the same as it leaves the rolls, one of said rolls being grooved to accommodate said extensions.

34. In a machine for making bags from continuous tube blanks, the combination of a table over which the blanks are passed, means for severing the entire width of the tube excepting a narrow central portion of the underply, means for disengaging the edges of the severed portion from the severing means, stripping means insuring the feed of the blank past said severing means, a depressible nose for opening successive portions of the tube adjacent the unsevered portions as the blanks are advanced, the table having a recess into which said nose may be depressed, pivotally mounted wings for forming bottom folds, means for creasing said folds transversely to define the area of the bottom preparatory to applying the paste, means for applying paste thereto, guiding means disposed behind the pasting means for holding and preventing the lifting of the tube while making the first transverse fold of the bottom, means for turning said first bottom flap, said means also serving to press or iron the same, and means for finishing said bottom.

35. In a machine for making paper bags from tubular blanks, the combination of a table over which the blanks are passed, means for feeding said blanks, bottom folding mechanism including a depressible opening nose to which said blanks are presented, means for lowering said nose against the tube to buckle the same and cause the upper ply of the advancing blank to rise and pass onto said nose, the table having a recess into which said nose may be depressed, a plate carried by the under side of said nose, means for advancing the blank and carrying the folded portion of the same under said plate, and means for defining the lateral dimensions of the bottom.

36. In a machine for making paper bags from tubular blanks, the combination of a table over which the blanks are passed, means for feeding a tube of paper from which such blanks are cut, bottom folding mechanism including a depressible opening nose to which said blanks are presented and pivotally mounted folding wings arranged at right angles to said nose, means for lowering said nose against the tube to buckle the same and cause the upper ply of the advancing blank to rise and pass onto said nose, the table having a recess into which said nose may be depressed, a plate carried by the under side of said nose, means for advancing the blank and carrying the folded portion under said plate, and means for defining the lateral dimensions of the bottom.

37. In a machine for making paper bags from tubular blanks, the combination of a table over which the blanks are passed, a depressible opening nose to which said blanks are presented, means for lowering said nose against the tube to buckle the same and cause the upper ply of the advancing blank to rise and pass onto said nose, the table having a recess into which said nose may be depressed, means for feeding the tube, means for folding the portion of the bottom raised by the nose, and a plate co-acting with said folding mechanism to define the lateral dimensions of the bag bottom.

38. In a machine for making bags from tubular blanks, the combination of a table over which the blanks are passed, a depressible opening nose to which said blanks are successively presented, a plate carried by the base of said nose, means for lowering said nose and its plate against the tube to buckle the same and cause its upper ply to rise and pass onto said nose, the table having a recess into which said nose may be depressed, means for advancing the blank, means for engaging said buckled portion of the blank during its movement to effect the bottom folds whereby it may be flattened to pass under said nose, means for feeding the blank under said nose, and a plate co-acting with said folding mechanism for defining the lateral dimensions of the bag bottom.

39. In a machine for making bags from continuous tube blanks wholly disconnected except for a narrow portion of the underply whereby they may be carried with the main body of the tube, the combination of a table over which the blanks are passed, means for feeding said blanks, means for forming the bottom including a depressible opening nose against which the blanks are carried and onto which the upper ply of the same is passed, the table having a recess into which said nose may be depressed, folding wings to fold down the portion opened whereby it may pass under the nose, a plate co-acting with said folding mechanism to define the dimensions of said bottom, mechanism for creasing said folded portions whereby the size and shape of said bottom may be defined, means for applying paste to parts of said folded portions, means for folding one of the bottom portions or flaps upon itself after paste has been applied, and rollers for pressing the rest of the pasted parts of said bottom.

In testimony whereof, I have signed my name to this specification, in the presence of two subscribing witnesses.

WILLIAM C. FULLER.

Witnesses:
MURRAY C. BOYER,
JOS. H. KLEIN.